United States Patent [19]
Grosbard

[11] 3,761,148
[45] Sept. 25, 1973

[54] MAGNETICALLY SUSPENDED ROTOR ASSEMBLY

[76] Inventor: Gregory Grosbard, 353 W. 19th St., Apt. 1, New York, N.Y. 10011

[22] Filed: Sept. 15, 1972

[21] Appl. No.: 289,362

[52] U.S. Cl. ................................................. 308/10
[51] Int. Cl. ........................................... F16c 39/06
[58] Field of Search.......................... 308/10; 74/5.47

[56] References Cited
UNITED STATES PATENTS
3,512,851    5/1970    Love ................................. 308/10
3,565,495    2/1971    Lyman .............................. 308/10
2,869,934    1/1959    Milligan ............................ 308/10
3,598,456    8/1971    Love ................................. 308/10

Primary Examiner—R. Skudy
Attorney—Harvey B. Jacobson

[57] ABSTRACT

A magnetic rotor is rotationally supported by end thrust bearings while accelerated up to a predetermined speed, the bearings being retracted to transfer suport of the rotor to a magnetic suspension arrangement when rotation exceeds said predetermined speed and the rotor is no longer being accelerated. The bearings are biased into engagement with the rotor shaft and retracted by power operated solenoids that are energized under control of a rotor speed sensor.

12 Claims, 5 Drawing Figures

MAGNETICALLY SUSPENDED ROTOR ASSEMBLY

This invention relates to the storage of kinetic energy in flywheel rotor assemblies or the like and more particularly to a rotor assembly and a related bearing control system.

Kinetic energy is generally stored by accelerating rotation of a flywheel rotor, the rotor being decelerated upon withdrawal of the kinetic energy. In view of the massiveness of such flywheel rotors, relatively large and rugged bearing assemblies are provided for rotational support of the rotor and such bearing assemblies necessarily involve a considerable amount of bearing friction. Attempts to utilize highly efficient, antifriction means in connection with such bearing assemblies, is usually incompatible with the relatively large bearing loads that accompany flywheel rotors. Thus, prior bearing systems are unable to cope with differences in bearing loads and problems encountered under static and dynamic conditions of the flywheel rotor resulting in bearing design sacrifices or compromises.

It is therefore an important object of the present invention to provide a flywheel rotor assembly that is rotationally supported in a most efficient manner under both static and dynamic conditions.

In accordance with the present invention, a flywheel rotor is supported for rotation under static conditions by end thrust bearings which are retracted from engagement with the rotor shaft under dynamic conditions when the rotor is rotating above a predetermined speed. Under dynamic conditions of the rotor assembly, rotational support is provided by a magnetic suspension. The rotor assembly is therefore constructed in accordance with the disclosure in my copending application U. S. Ser. No. 289,361 filed Sept. 15, 1972. As a result of this construction, magnetic suspension of the rotor assembly is made practicable and acceleration of the rotor assembly by electromagnetic means is facilitated.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
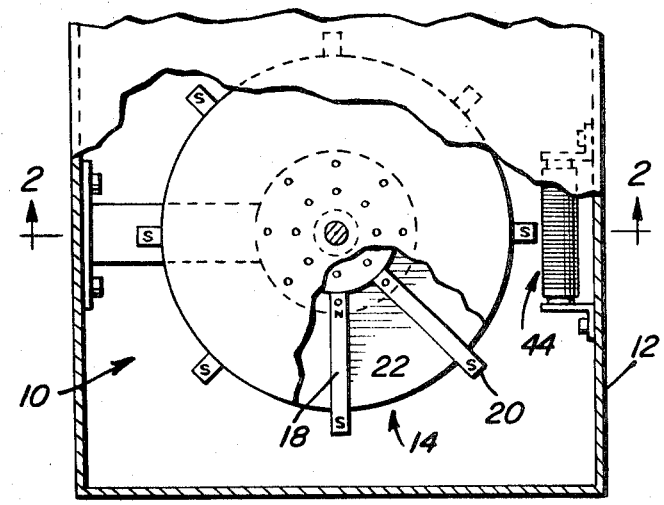
FIG. 1 is a top plan view with parts broken away showing a magnetic flywheel rotor assembly and bearing system constructed in accordance with the present invention.
Figure 2:
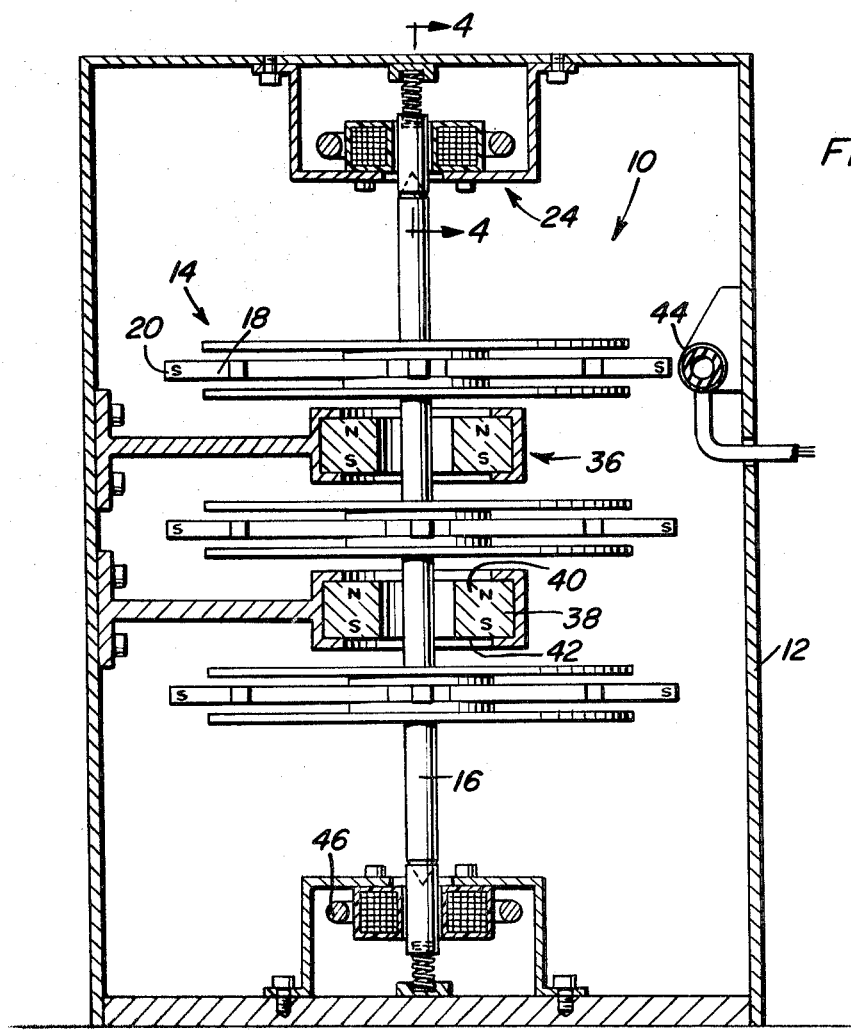
FIG. 2 is a side sectional view taken substantially through a plane indicated by section line 2—2 in FIG. 1.

Referring now to the drawings in detail, FIGS. 1 and 2 illustrate a flywheel rotor assembly generally referred to by reference numeral 10 enclosed within any suitable stationary housing 12 and associated with any suitable mechanism requiring the storage and withdrawal of kinetic energy by means of a flywheel as is well known to persons skilled in the art. In the illustrated embodiment, three rotor sections 14 of identical construction are rotationally fixed to a common rotor shaft 16. The number of rotor sections may of course vary in accordance with energy and installational requirements. Each rotor section 14 is constructed in accordance with the rotor assembly disclosed in my copending application, U. S. Ser. No. 289,361, filed Sept. 15, 1972, aforementioned. Briefly, each rotor section 14 includes a plurality of radially extending bar magnets 18 or their equivalents having pole faces 20 of the same polarity angularly spaced from each other about the periphery of the rotor section. The radially inner end portions 22 of the bar magnets as shown in FIG. 1, are also of the same polarity but opposite in polarity to the pole faces 20. Accordingly, the radially inner portion of each rotor section on opposite axial sides along the common rotor shaft 16, will be of one magnetic polarity opposite to the polarity of the peripheral pole faces 20. The magnetic fields emanating from each rotor section are not disturbed by the common rotor shaft 16 which is accordingly made of a non-magnetic material.

Figure 4:
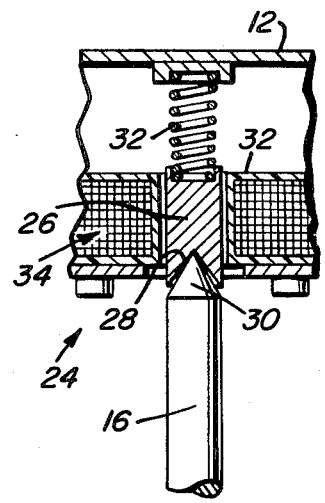
FIG. 4 is an enlarged partial sectional view taken substantially through a plane indicated by section line 4—4 in FIG. 2.

The common rotor shaft 16 is rotationally supported under static conditions by structurally similar, retractable end thrust bearing assemblies 24. As more clearly seen in FIG. 4, each bearing assembly 24 includes an end thrust bearing member 26 having a conical bearing socket 28 receiving the conical end bearing portion 30 of the rotor shaft. The bearing member 26 is biased into engagement with the end portion of the rotor shaft by a spring 32 and is guided for axial movement along the rotational axis of the rotor shaft within the spool 32 of a power operated solenoid 34. It will be apparent therefore, that when the power operated solenoids 34 associated with the bearing assemblies 24 are de-energized, the rotor shaft 16 together with the rotor sections 14 secured thereto, are supported for rotation at the upper and lower ends of the rotor shaft by engagement with the bearing members 26 under the bias of springs 32. The bearing members 26 also form the armature portions of the power operated solenoids 34 so that when the solenoids are energized, the bearing members 26 are axially retracted from the rotor shaft against the bias of the springs 32. In this fashion, the bearing friction exerted on the rotor shaft by the bearing members is removed. The rotor assembly 10 will then be rotationally supported by magnetic suspension means including a pair of fixedly mounted and axially spaced magnetic assemblies 36.

Figure 3:
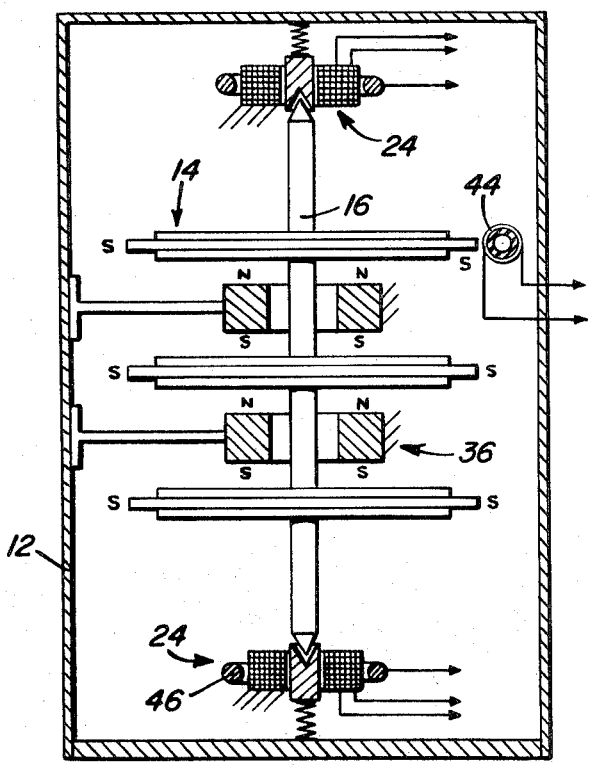
FIG. 3 is a simplified side sectional view of the rotor system.

Each of the magnetic assemblies 36 as shown in FIGS. 2 and 3, includes an annular magnet 38 having axial pole faces 40 and 42 of opposite polarity axially positioned between adjacent rotor sections 14. The upper pole faces 40 of the magnets 38 are of the same polarity as the radially inner portions of the rotor sections so as to upwardly repel the rotor section thereabove. The lower pole faces 42 of the magnets 38 on the other hand are opposite in polarity to the radially inner portion of the adjacent rotor section positioned therebelow so as to upwardly attract the rotor section. Accordingly, the repulsive and attractive forces developed between the rotor sections and the magnetic suspension assemblies 36, are balanced by the gravitational force or weight of the rotor assembly 10 to floatingly support the rotor assembly for rotation once the rotor shaft is disengaged from the end thrust bearing members 26 as aforementioned.

Fixedly positioned in close spaced relation to the periphery of at least one of the rotor sections 14, is an electromagnetic coil assembly 44 as shown in FIGS. 1, 2 and 3. By applying a pulsating d.c. current to the coil assembly 44, an accelerating impulse may be imparted to the rotor assembly through the adjacent rotor section because of the magnetic coupling between the coil assembly and the periphery of the adjacent rotor section. Also, because of this magnetic coupling, rotation of the rotor assembly will induce a pulsating signal in the coil assembly of a frequency reflecting the speed of the rotor assembly. The coil assembly 44 may therefore be utilized for rotor acceleration and speed sensing purposes.

As shown in FIGS. 2 and 3, a.c. stabilizing coils 46 are positioned adjacent to the opposite axial end portions of the rotor shaft for sensing and compensating for rotor wobble or vibration transverse to the rotational axis. Rotor wobble will thus be detected by the coils 46 through which a compensating current may be supplied in order to correct for such wobble by generating a magnetic field tending to stabilize the rotor assembly. Such stabilization is of course available for the rotor assembly only when it is rotating above a predetermined speed while supported by the magnetic suspension assemblies 36. This predetermined speed of the rotor assembly may of course be determined by the coil assembly 44 in its speed sensing mode.

Figure 5:
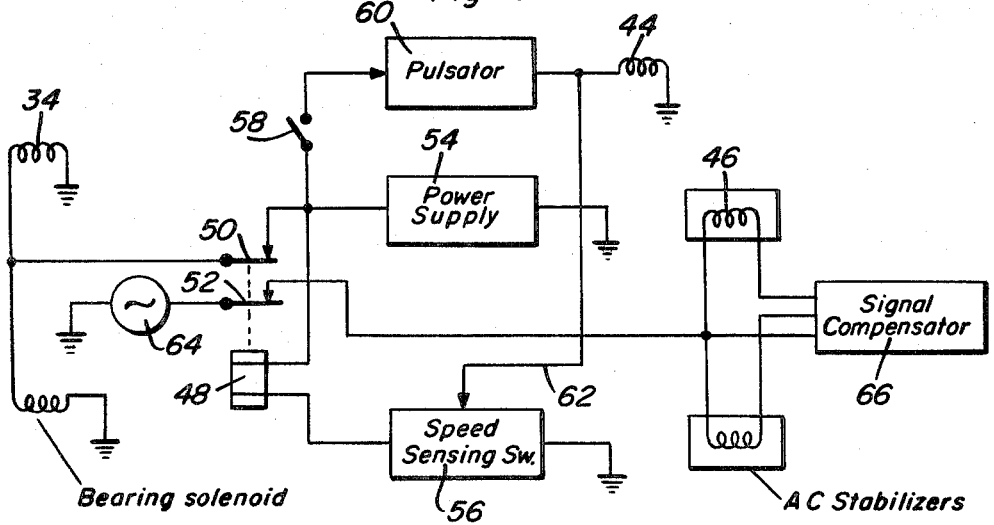
FIG. 5 is a simplified electrical circuit diagram showing the control system associated with the present invention.

FIG. 5 illustrates a typical electrical control system for accomplishing the aforementioned control objectives of the invention. The control system includes a relay coil 48 associated with a pair of normally closed relay switches 50 and 52. A suitable power supply 54 is connected to the relay coil 48 for energization thereof under static conditions of the rotor system through a speed sensing switch device 56. Accordingly, under static conditions, the relay switches 50 and 52 will be open to maintain the bearing solenoids 34 de-energized. The rotor shaft 16 will then be rotationally supported by the end thrust bearings 26. Upon closing of the switch 58, electrical energy will be selectively supplied to the pulsator 60 from which a source of pulsating current is supplied to the coil assembly 44 in order to accelerate the rotor assembly as aforementioned. As the rotational speed of the rotor assembly increases, a speed signal from the coil assembly 44 is supplied by line 62 to the speed sensing switch device 56. Accordingly, when the speed of the rotor assembly exceeds a predetermined value, the switch device 56 opens so as to de-energize the relay coil 48. The relay switches 50 and 52 then close. Relay switch 50 then connects the power supply to the bearing solenoids 34 so as to retract the end thrust bearings thereby transferring rotational support of the rotor assembly to the magnetic suspension devices 36 as aforementioned. Also, upon closing of relay switch 52, the output of an oscillator 64 is then applied to the stabilizing coils 46 and a signal compensator circuit 66 from which outputs are applied to the stabilizer coils 46 to correct for any rotor wobble as aforementioned. Any suitable signal compensator system may be utilized for this purpose, the details of which form no part of the present invention. Pulsators and speed sensing switch devices capable of achieving the objectives aforementioned in connection with FIG. 5, are also well known and the details thereof form no part of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a rotor assembly having a plurality of peripherally spaced pole faces of the same polarity and a radially inner pole portion of opposite polarity, a non-magnetic shaft fixed to the rotor assembly for rotation therewith, means for accelerating rotation of the rotor assembly about an axis through the shaft, axial thrust bearing means engageable with the shaft for rotational support of the rotor assembly, and means for retracting the bearing means from engagement with the shaft during rotation of the rotor assembly.

2. The combination of claim 1 including magnetic suspension means for floatingly supporting the rotor assembly while the bearing means is disengaged from the shaft.

3. The combination of claim 2 wherein the bearing retracting means comprising power operated means for displacing the bearing means relative to the shaft, a source of energy and speed sensing means for connecting said source to the power operated means in response to rotation of the rotor assembly above a predetermined speed.

4. The combination of claim 3 including rotor stabilizing means rendered operative simultaneously with the power operated means to detect and compensate for transverse vibration of the shaft.

5. The combination of claim 4 wherein said means for accelerating the rotor assembly comprises an accelerating coil positioned peripherally adjacent to the rotor assembly, current pulsating means connecting the accelerating coil to the source of energy, and means responsive to operation of the bearing retracting means for disconnecting the accelerating coil from said source.

6. The combination of claim 1 wherein the bearing retracting means comprises power operated means for displacing the bearing means relative to the shaft, a source of energy and speed sensing means for connecting said source to the power operated means in response to rotation of the rotor assembly above a predetermined speed.

7. The combination of claim 6 wherein said means for accelerating the rotor assembly comprises an accelerating coil positioned peripherally adjacent to the rotor assembly, current pulsating means connecting the accelerating coil to the source of energy, and means responsive to operation of the bearing retracting means for disconnecting the accelerating coil from said source.

8. The combination of claim 7 including magnetic suspension means for floatingly supporting the rotor assembly while the bearing means is disengaged from the shaft.

9. In combination with a rotor assembly having a plurality of peripherally spaced pole faces of the same polarity, and a radially inner pole portion of opposite polarity, a non-magnetic shaft fixed to the rotor assembly for rotation therewith, axial thrust bearing means engageable with the shaft for rotational support of the rotor assembly, and means for retracting the bearing assembly from engagement with the shaft in response to rotation of the rotor assembly above a predetermined speed.

10. The combination of claim 9 including means for selectively accelerating the rotor assembly during rotation below said predetermined speed.

11. The combination of claim 10 including magnetic suspension means for floatingly supporting the rotor assembly while the bearing means is disengaged from the shaft.

12. The combination of claim 9 including magnetic suspension means for floatingly supporting the rotor assembly while the bearing means is disengaged from the shaft.

* * * * *